April 16, 1935.  T. J-B. LAFITTE  1,997,733
ENGINE STARTER
Filed March 25, 1933

Inventor
Theodore Jean-Baptiste Lafitte
by McConkey and Smith
Attorneys

Patented Apr. 16, 1935

1,997,733

UNITED STATES PATENT OFFICE 1,997,733

ENGINE STARTER

Théodore Jean-Baptiste Lafitte, Paris, France, assignor to Eclipse Machine Company, Elmira Heights, Elmira, N. Y., a corporation of New York Application March 25, 1933, Serial No. 662,851
In France October 6, 1932

4 Claims. (Cl. 74—7)

This invention relates to an engine starter but more particularly to a drive for transmitting motion from a starting motor to an engine to be started.

One object of the invention is to provide a drive wherein the parts which should be maintained clean are protected and thus rendered more serviceable and susceptible of longer use without faulty operation.

Another object is to provide a drive comprised of parts which may be quickly and cheaply constructed as stampings.

Still another object is to provide a drive whose dimensions are reduced to a minimum.

Figure 1:
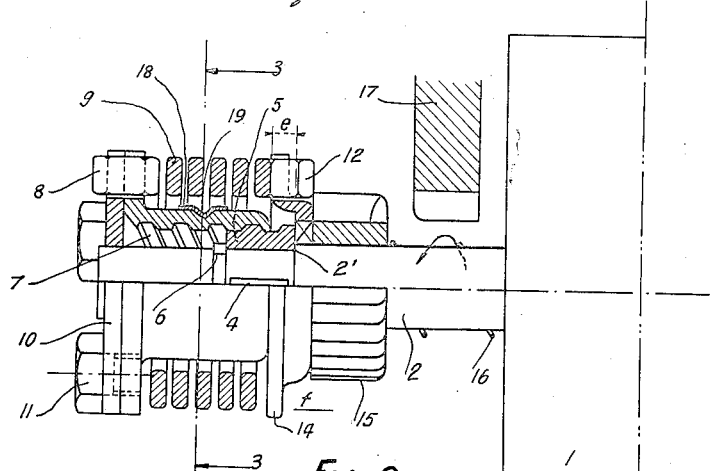
Figure 2:
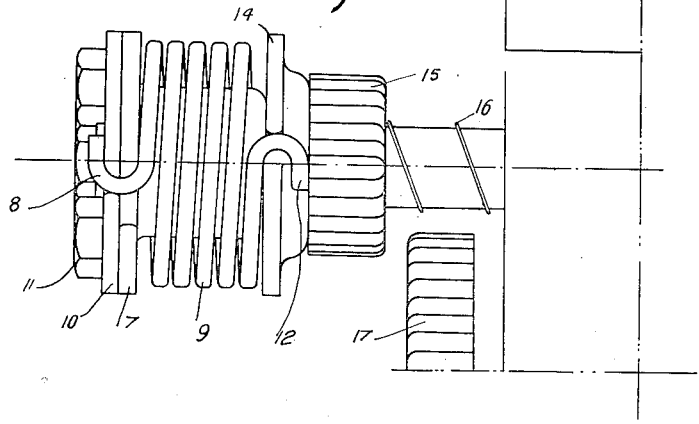
Figure 3:
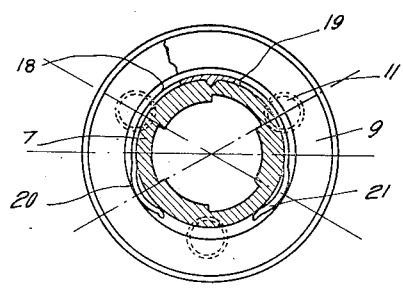

Other objects and advantages of the invention will be evident from the accompanying specification and drawing wherein:

Fig. 1 is an elevation partly in section;
Fig. 2 is an elevation; and
Fig. 3 is a section at 3—3 on Fig. 1.

The shaft 2 of the starting motor 1 carries a screw 5 splined thereon through the intermediary of splines 4. The screw butts on one of its sides against the shoulder 2' of the shaft 2 and is maintained in place by a ring 6. A nut 7 which may be provided as a stamping is disposed about the screw 5 in threaded engagement therewith and to the nut is hooked, by means of a hook 8, a spring 9 which is maintained in position by a washer 10 centered on the shaft 2 and fixed to the nut 7 by means of screws 11. A second hook 12 attaches the spring 9 to a washer 14 which is fixed to the pinion 15, the pinion 15 being mounted on the smooth portion of the shaft 2 for ready longitudinal or rotary movement thereon.

A spring 16 is interposed between the starter 1 and the pinion 15 and tends to maintain the pinion disengaged from the gear 17 with which the pinion is adapted to mesh to effect rotation of an engine to be started. An element 18 in the form of a flat spring embraces exteriorly the nut 7 and is maintained in position by a sort of eminence 19 which engages a depression in the nut, and also by its extremities 20 and 21 which are suitably arched. This spring 18 maintains the spring 9 concentric with respect to the nut 7 and prevents it from being displaced and thus engaging the adjacent elements.

The functioning of the mechanism is as follows:

As a result of the rotation of the shaft 2 on energization of the starting motor and as a result of the inertia of the ensemble, the left-handed threaded screw 5 screws into the nut 7 and since the screw 5 is fixed on the shaft 2, the nut 7, the spring 9, the washer 14 and the pinion 15 are displaced in the direction of the arrow $f$, at the same time compressing the spring 16 and effecting the meshing of the pinion 15 with the gear 17. This displacement is arrested when the washer 10 engages the ring 6 and at this moment the pinion 15 and the gear 17 are suitably meshed and the gear 17, as well as the motor to which it is fixed, are about to be rotated, the rotational effort being transmitted elastically due to the presence of spring 9 which transmits the couple of the starter 1 to the washer on which the pinion 6 is fixed.

On the other hand, the meshing of the teeth of the pinion 15 with the teeth of the gear 17 is effected flexibly due to the presence of spring 9 which may be longitudinally compressed as a consequence of the play "$e$" which is provided between the extremity of the nut 7 and the washer 14. As a result of the effort necessary to effect starting, the diameter of the spring 9 decreases and the turns of the spring take support on the exterior of the nut 7 thereby flattening the extremities 20 and 21 of the spring 18. The decreasing diameter of the spring is thus limited to a reasonable value and as a consequence rupture is precluded and at the same time all the turns of the spring are brought into engagement with the exterior of the nut and there results therefrom a provision effectively operating to preclude damaging of the spring.

On starting of the engine the gear 17 rotates the pinion 15 at a speed which permits the nut 7 to unscrew on the screw 5 and to return to its position as indicated in Figure 1, assisted by the spring 16 which tends to maintain the ensemble in the position of Figure 1 during the operation of the engine.

As a result of the construction and disposition of the elements, the overall length of the starting mechanism, and consequently the over-hang, is considerably reduced. The screw 5 and the interior of the nut 7 are protected from deposits of foreign matter as a result of the closed construction provided by the screw 5, the nut 7 and the washer 10, with the result that the working parts remain clean, long functioning is insured, and disassembly avoided. The inertia, from a rotary point of view, is considerable since it results from the screw 7, the spring 9, the washer 10, the screws 11, the washer 14 and the pinion 15 all taken together, but the inertia of the system from a longitudinal point of view is reduced to the effect of the pinion 15 and a part of the spring 9, by consequence of the elasticity of the spring which may be compressed by a quantity "e".

This is of considerable importance and permits a meshing of the teeth of the pinion 15 and the gear 17 without shock. With the exception of the screw 5 and the pinion 15 the elements may be constructed as stampings or from sheet iron of minimum weight, cut or folded. From a constructional point of view, this is a considerable advantage and from the point of view of the device itself, limits the inertia of rotation leaving it of a value sufficient to effect the proper operation of the device.

What I claim is:

1. In an engine starter, a drive shaft, a screw member fixed thereto intermedate its length, a pinion journalled on said shaft normally in abutting relation to the screw member whereby said screw member defines the normal position of the pinion on the shaft, a nut threaded on said screw member having a closure and thrust element fixed thereto on the opposite side of the screw member from the pinion, a yielding driving and traversing connection between the nut and pinion, and resilient means for limiting the deflection of said yielding connection.

2. In an engine starter, a drive shaft, a screw member fixed thereto intermediate its length, a pinion journalled on said shaft normally in abutting relation to the screw member, a nut threaded on said screw member having a closure and thrust element fixed thereto on the opposite side of the screw member from the pinion, a coiled spring forming a yielding driving and traversing connection between the nut and pinion, means yieldably urging the pinion against the screw member, and yielding means fixed to said nut for limiting the winding down of the spring.

3. In an engine starter, a drive shaft, a pinion journalled thereon and slidable into and out of engagement with a member of the engine to be started, a screw member fixed on said shaft forming an abutment defining the idle position of the pinion, a nut threaded on said screw member normally in spaced relation to the pinion, a connecting member fixed to the pinion normally bridging said space, a compressible coiled spring surrounding said nut and connected at its ends to said nut and connecting member respectively, and yielding means for limiting the contraction of said spring.

4. In an engine starter, a drive shaft, a pinion journalled thereon and slidable into and out of engagement with a member of the engine to be started, a screw member fixed on said shaft forming an abutment for the pinion in its idle position, a nut threaded on said screw member normally in spaced relation to the pinion, a connecting member fixed to the pinion normally bridging said space, a coiled spring surrounding said nut in spaced relation therewith, connected at its ends to said nut and connecting member respectively and serving to maintain the pinion and nut in normal spaced relation, and a yielding collar fixed to the nut for limiting the winding down of the spring thereon.

THÉODORE JEAN-BAPTISTE LAFITTE.